United States Patent [19]

Gunter, Jr. et al.

[11] Patent Number: 4,632,548

[45] Date of Patent: Dec. 30, 1986

[54] PROJECTION LENS SCANNING LASER VELOCIMETER SYSTEM

[75] Inventors: William D. Gunter, Jr., San Jose; Anemarie De Young, Berkeley, both of Calif.

[73] Assignee: The United States of America as represented by the Administrator of the National Aeronautics and Space Administration, Washington, D.C.

[21] Appl. No.: 692,745

[22] Filed: Jan. 18, 1985

[51] Int. Cl.$^4$ ............................................. G01P 3/36
[52] U.S. Cl. ..................................... 356/28.5; 356/28
[58] Field of Search ................................ 356/28, 28.5

[56] References Cited

U.S. PATENT DOCUMENTS

| | | | |
|---|---|---|---|
| 3,860,342 | 1/1975 | Orloff et al. | 356/28 |
| 3,895,872 | 7/1975 | Dandliker et al. | 356/28 |
| 3,897,152 | 7/1975 | Farmer et al. | 356/28 |
| 3,946,233 | 3/1976 | Erben et al. | 356/4 X |
| 4,063,814 | 12/1977 | Rhodes | 356/28 |
| 4,148,585 | 4/1979 | Bargeron et al. | 356/28.5 |
| 4,167,329 | 9/1979 | Jelalian et al. | 356/28.5 X |
| 4,346,990 | 8/1982 | Rhodes | 356/28.5 |
| 4,537,503 | 8/1985 | Liu | 356/28.5 |

*Primary Examiner*—Stephen C. Buczinski
*Assistant Examiner*—Linda J. Wallace
*Attorney, Agent, or Firm*—Darrell G. Brekke; John R. Manning; Robert D. Marchant

[57] ABSTRACT

A laser Doppler velocimeter (LDV) system (10) has a laser (12), a waist position adjusting lens (13), and a beam splitter (15), which direct laser beams (14) parallel to optical axis (16) of negative lens (18). Negative lens (18) is fixed relative to afocal lens pair (24,26). A pair of planar mirrors (20, 22) intersect at right angles and respectively intersect optical axis (16) and optical axis (28) of the afocal lens pair. Mirrors (20, 22) are movable along optical axis (28) toward and away from afocal lens pair (24, 26) to focus laser beams (14) in focus area (30) while maintaining a constant beam waist, crossing angle and intersection with other laser beams to produce a constant sensitive volume as the focus is changed.

9 Claims, 3 Drawing Figures

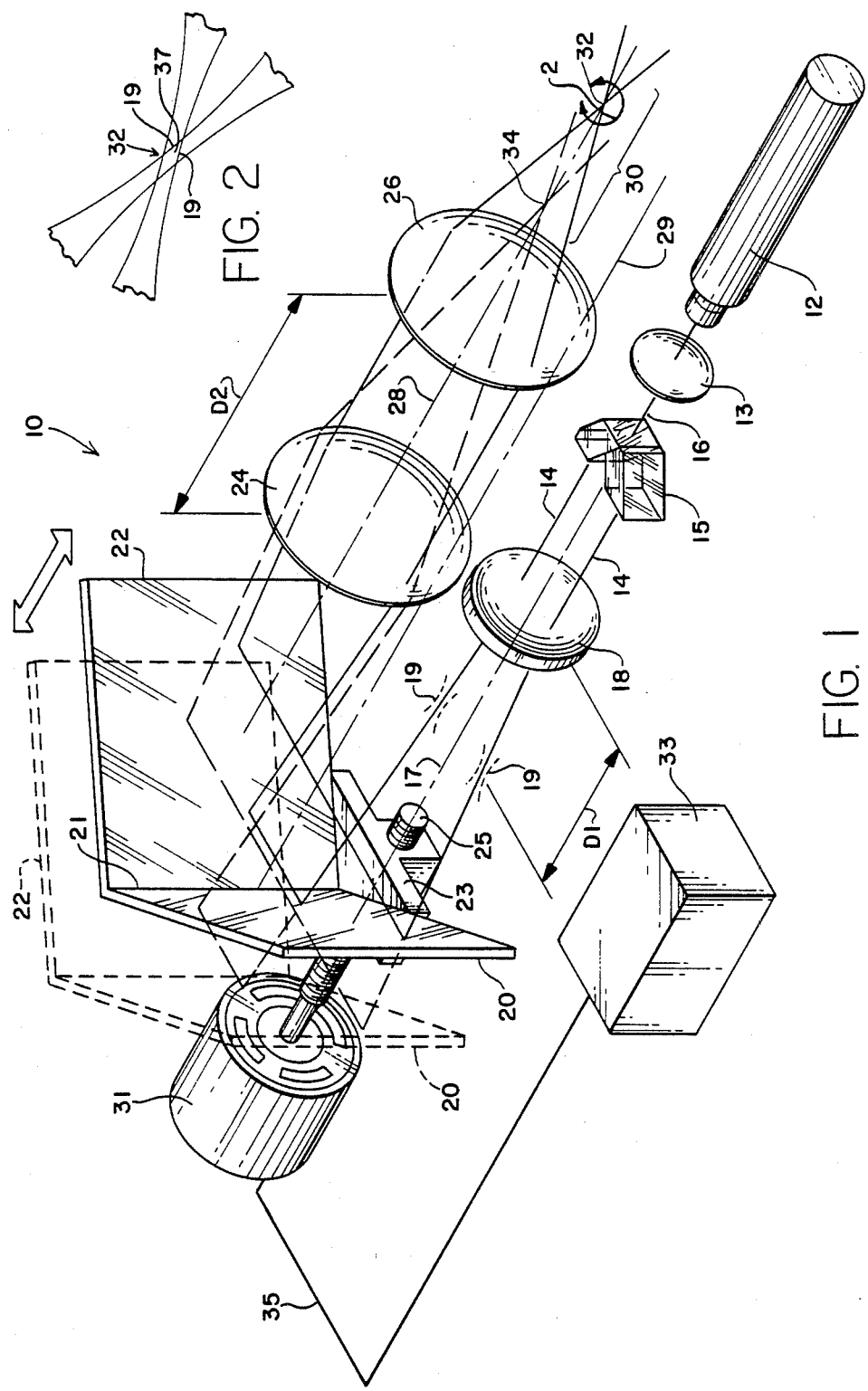

PROJECTION LENS SCANNING LASER VELOCIMETER SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to a laser Doppler velocimeter (LDV) incorporating an improved focusing system. More particularly, it relates to such an LDV in which a constant laser beam waist size and position at the crossing point of the laser beams is maintained when the LDV is focused at different points.

2. Description of the Prior Art

LDVs have proven to be very valuable tools for measuring velocity characteristics of moving fluids, particularly for measuring air flow around airfoils and similar structures in wind tunnels. The basic principle of operation is that coherent laser light scattered from particulate matter in a fluid moving with a particular velocity will be Doppler shifted by an amount determined by the laser wavelength and the index of refraction of the scattering medium. It is often desirable to measure different LDV parameters simultaneously to give a more complete description of the fluid flowfield being studied. Because of the high data rates generated by LDVs and the amount of signal processing of the LDV data required to characterize the fluid flow, LDVs place rather severe demands on data processing systems to which they are connected and to data interfaces between the LDVs and the data processing systems. LDVs are described, for example, in the following issued U.S. Patents: U.S. Pat. No. 3,860,342, issued Jan. 14, 1975 to Orloff et al.; U.S. Pat. No. 3,895,872, issued July 22, 1975 to Dandliker et al.; U.S. Pat. No. 3,897,152, issued July 29, 1975 to Farmer et al.,; U.S. Pat. No. 4,063,814, issued Dec. 20, 1977 to Rhodes; U.S. Pat. No. 4,148,585, issued Apr. 10, 1979 to Bargeron et al.; U.S. Pat. No. 4,167,329, issued Sept. 11, 1979 to Jelalian et al. and U.S. Pat. No. 4,346,990, issued Aug. 31, 1982 to Rhodes. The state of the art in LDVs is further indicated in Durst et al., "Influence of Gaussian Beam Properties on Laser Doppler Signals", Applied Optics, 18, No. 4, pp. 516–524, Feb. 15, 1979.

In particular, the Rhodes U.S. Pat. No. 4,346,990 provides an ingenious geometric optics solution to the need for rapid scanning along an optical axis to produce high speed sampling of flows being characterized with the LDV apparatus. However, the fixed afocal lens and movable scanning lens technique there described does not address the diffraction optics aspects of the problem.

The beams from many lasers, including those most used in velocimetry, have a Gaussian intensity profile. The narrowest place, or waist, of a Gaussian beam corresponds in a certain sense to the focus of a typical geometric optics beam. For example, if the narrowest parts of a geometric optics beam are at equal distances in front of and behind a lens, they are each at a distance of 2f from the lens of focal length f and are the same size. If the waist of a Gaussian laser beam is placed one focal length in front of a lens, the lens will form a new beam waist one focal length behind the lens and not necessarily the same size as the input waist.

In the apparatus of the Rhodes U.S. Pat. No. 4,346,990, two beams cross, always at the same angle, and their crossing volume forms the sensitive volume of the velocimeter. But, if each of these beams does not have a beam waist located at their intersection, the interference fringes formed by their crossing will not be parallel. As a result, beam accuracy is affected, because the beam waists will not remain at the beam intersection as the velocimeter is scanned, resulting in degradation of the measurement.

Further, the beam waists that should cross to form the sensitive volume do not remain the same size as the system is scanned. It is often undesirable for the focus spot diameters, i.e., the beam waists at the crossing, to become larger. The light intensity, and thus the light scattered from a dust particle, goes down as the inverse square of the focus spot diameter. Similarly, it is often undesirable for the focus spot diameter to become much smaller. This reduces the number of fringes that can be counted during passage of a particle through the test volume. These volume changes can also influence the collection of data so that counting rates would be different in different parts of the fluid stream. The optimum bias setting for noise rejection is different for different parts of the scan with different waist volumes.

The other above-identified patents disclose a variety of techniques for focusing parallel LDV beams at points in space. These techniques provide a scan by either moving a focusing element or by employing a focusing element of variable focal length. However, such techniques inherently cannot maintain constant crossbeam angle and focal volume dimensions. If the crossbeam angle and focal volume are not maintained constant, the Doppler shift in the scattered light is dependent on the focal volume location as well as the velocity of the scattering particle and require calibration of equipment for each focal position.

SUMMARY OF THE INVENTION

Accordingly, it is an object of this invention to provide an LDV which scans its sensitive volume to greater and smaller distances from the beam generation system, while maintaining a constant beam crossing angle, beam waist diameter and beam waist location at the crossing point.

It is another object of the invention to provide such an LDV in which rate of motion required for mechanical parts in the LDV for a given scan speed is reduced.

It is a further object of the invention to provide such an LDV in which diffraction of Gaussian intensity profile laser beams does not prevent production of parallel interference fringes at beam crossings.

The attainment of these and related objects may be achieved through use of the novel LDV herein disclosed. An LDV in accordance with this invention has an afocal lens means providing a constant crossbeam angle, constant focal volume and constant magnification. A laser or other emitting means is provided for producing parallel light beams. A retro reflecting means is positioned behind the afocal lens means to direct the light beams antiparallel to their emitted direction and along an optical axis of the afocal lens means. An input lens is positioned in the so defined light path between the emitting means and the afocal lens means. A waist position adjusting lens is positioned in the so-defined light path between the emitting means and the input lens means in the proper position to project the laser waist to one input lens focal length distance on the opposite side of the input lens. A beam dividing means is positioned in the so-defined light path, downstream of the waist position adjusting lens, in order to divide the beam into two coherent, parallel beams. The retro reflecting means is movable parallel to the optical axis of the afocal lens means and to an optical axis of the input lens to vary the optical distance between the input lens and the afocal lens means.

In operation of the LDV of this invention, moving the retro reflecting means parallel to the optical axes changes the optical distance between the input lens and the afocal lens means, thus translating the sensitive volume defined by the light beams along the optical axis of the afocal lens means. Changing the optical distance in this manner assures a constant focus spot size (the beam diameter at the LDV crossing) and assures that these beam waists remain located at the beam crossing as that crossing is scanned.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of an LDV in accordance with the invention.

FIG. 2 is an enlarged view of the area 2 shown in FIG. 1.

DETAILED DESCRIPTION OF THE INVENTION

Figure 3:
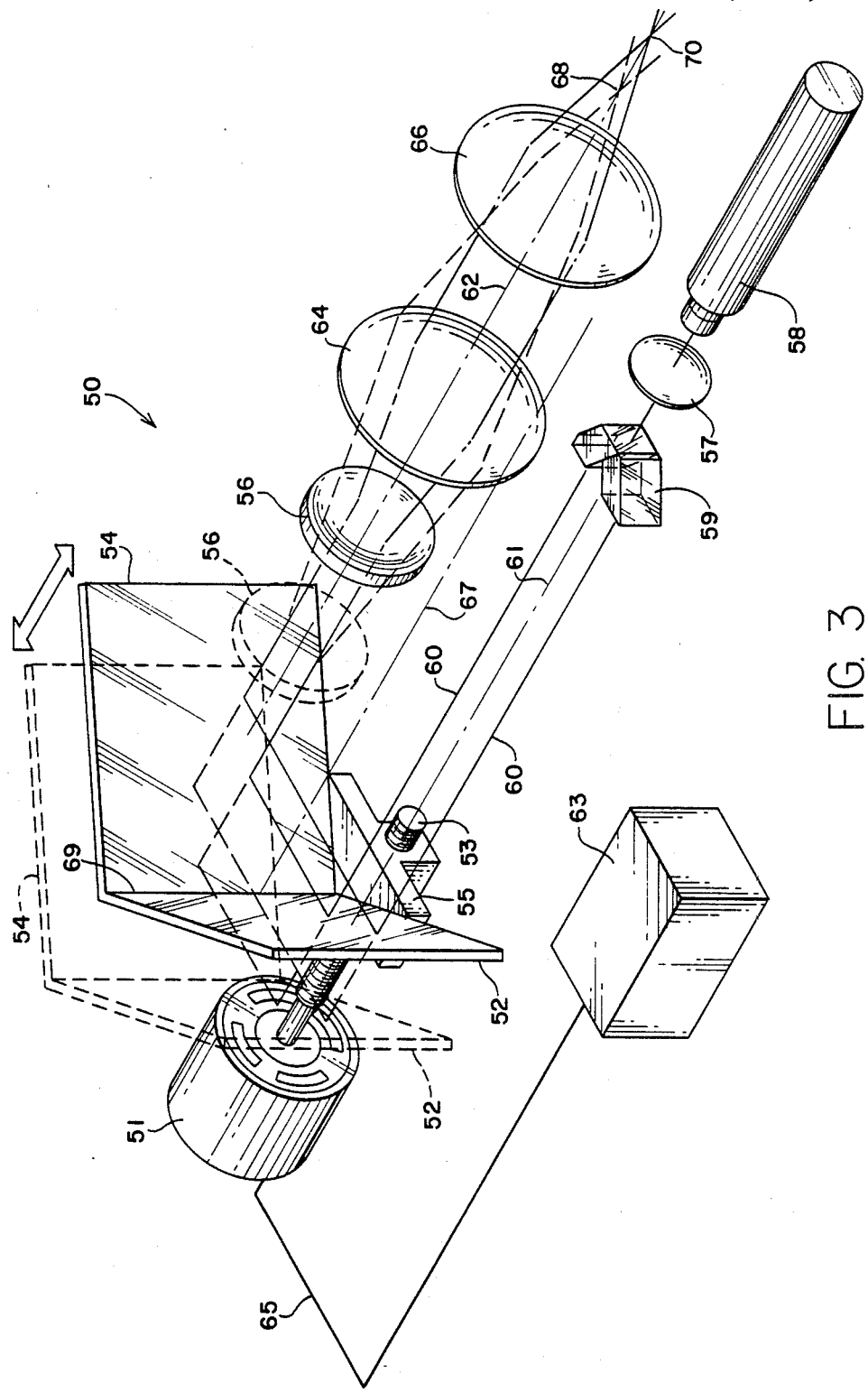
FIG. 3 is a perspective view similar to that shown in FIG. 1 of another LDV in accordance with the invention.

Turning now to the drawings, more particularly to FIG. 1, there is shown an LDV 10 in accordance with the invention. Laser 12 is positioned to direct input beam 16 along optical axis 17 of the positive lens 13. Positive lens 13 is positioned to project (virtual) laser waists 19 to one focal length distance D1 of negative lens 18 beyond that lens. Beam divider 15 is positioned perpendicular to input beam 16 and optical axis 17 in such a way as to produce two parallel, horizontal beams 14. Positive lens 13, beam divider 15 and negative lens 18 are fixed relative to the position of laser 12. Planar mirrors 20 and 22 intersect at a right angle at 21 and are mounted on a common mount 23, with mirror 20 intercepting optical axis 17 of the negative lens 18 at a 45 degree angle. Lenses 24 and 26 are an afocal lens combination, positioned a distance D2 apart, where D2 equals the sum of the focal lengths of lenses 24 and 26, with their optical axis 28 parallel to the optical axis 17. Mirror 22 intersects the optical axis 28 at a 45 degree angle. Support 23 for the mirrors 20 and 22 is threaded to lead screw 25, so that mirrors 20 and 22 are movable parallel to the optical axes 17 and 28 along a third optical axis 29 passing through intersection 21, toward and away from the lenses 18 and 24. Moving the mirrors 20 and 22 in this manner lengthens the optical distance between the negative lens 18 and the afocal lens pair 24, 26. Motor 31 is connected to drive the lead screw 25, and control 33 is connected to the motor 31 by line 35 to control operation of the motor 31.

In operation of the LDV 10, the negative lens 18 and the afocal lens pair 24, 26 serve to focus the parallel laser beams 14 along the optical axis 28 in a focus area 30 in front of the lens 26. The motion of the mirrors 20 and 22 serves to move the focal point along the axis 28, thus allowing the focus area 30 to be scanned. Focal points 32 (see also FIG. 2) and 34, for example, result from the positions shown for the mirrors 20 and 22. This method of scanning assures that the Gaussian profile laser beams 14 have their beam waists 19 at the focal point, such as focal point 32 shown in FIG. 2 during the scanning. Since the beam waist size and crossing angle remain constant, the crossing volume 37 (FIG. 2) also remains constant.

FIG. 3 shows another LDV system 50 incorporating a pair of retro reflecting planar mirrors 52 and 54 of the same type as the mirrors 20, 22 in the FIG. 1 embodiment and a movable negative lens 56. Mirrors 52 and 54 are mounted on a support 55, which is threaded to lead screw 53. Motor 51 is connected to drive the lead screw 53. Control 63 is connected to the motor 51 by line 65 to control operation of the motor 51, so that the mirrors can be moved forward and back along optical axis 67, which passes through intersection 69 of the mirrors 52, 54. Laser 58, positive lens 57, and beam divider 59 are positioned to direct laser beams 60 along optical axis 61 of the positive lens 57 parallel to optical axis 62 of afocal lens pair 64, 66. Positive lens 57 is positioned to project the (virtual) laser beam waist to one focal length distance of negative lens 56 beyond that lens. Beam divider 59 is positioned perpendicular to the input beam in such a way as to produce two parallel, horizontal beams 60. Negative lens 56 is movable along the optical axis 62 toward and away from lens 64. The mirrors 52, 54 are moved half as far and in the same direction as lens 56. This ensures that the distance between the lens 56 and the laser waist projected by lens 57 remains constant. The focal length ratio of the lenses 64 and 66 is 2 to 1, which gives a factor of $2^2=4$ in the distance that movement of lens 56 varies the position of focal points 68, 70, due to geometric optics. The presence of the mirrors 52, 54 gives another factor of 2, since the light travels twice as far as the mirrors, thus giving a scan ratio of 8 to 1 for the system 50 (four times as fast as the lens motion, eight times as fast as the mirror motion).

In a similar manner to the FIG. 1 embodiment, the presence of the retro reflecting mirrors 52 and 54 and movement of the lens 56 scans the location of the input beam waists along the optical axis as the system is focused to different focal points, thus giving a constant crossing volume for plural beams as the crossing volume is scanned along the optical axis.

It should now be readily apparent to those skilled in the art that a novel LDV system capable of achieving the stated objects of the invention has been provided. The system provides a constant beam waist position and size at the focal point, constant crossing angle and constant sensitive volume as a result of movement of the beam waist with changes in focus. The system allows a lesser movement linearly to produce a greater scan distance along the optical axis and provides constant, parallel fringes from a Gaussian intensity distribution beam.

It should further be apparent to those skilled in the art that various changes in form and detail of the invention as shown and described could be made. For example, a corner cube could be used in place of the retro reflector mirror pairs shown, or a positive lens could be substituted for the first negative lens. Also, this system is not limited to two laser beams, but will work for any number of beams. The focal length ratio of the afocal lens pair can be any number. It is intended that such changes be included within the spirit and scope of the claims appended hereto.

What is claimed is:

1. A Doppler velocimeter comprising an afocal lens system with an optical axis, a light emitting means for producing parallel light beams, a reflector positioned behind said afocal lens system to direct the light beams antiparallel to their emitted direction along said optical axis, an input lens positioned in the so defined light path between said light emitting means and said afocal lens system, said reflector being movable to and fro relative to said afocal lens system in opposite directions that are parallel to said afocal lens system optical axis to vary the optical distance between said input lens and said afocal lens system and to produce a movable focus of crossed light beams with interference fringes where the crossbeam angle and focal volume are constant and the fringes are parallel for any relative movement of said reflector.

2. The Doppler velocimeter of claim 1 wherein said input lens is fixed in position between said reflector and said light emitting means.

3. The Doppler velocimeter of claim 1 in which said reflector comprises a pair of planar mirrors which intersect orthogonally, said mirrors being positioned so that one of said mirrors intersects the optical axis of said input lens at a 45 degree angle and the other of said mirrors intersects the optical axis of said afocal lens system at a 45 degree angle.

4. The Doppler velocimeter of claim 1 wherein said input lens is located on said optical axis of said afocal lens system between said afocal lens system and said reflector and said input lens is movable relative to said afocal lens system.

5. A Doppler velocimeter system having a sending optical system comprising a light emitting means for producing a coherent, nominally parallel light beam along a first optical axis in front of said light emitting means, a negative focal length input lens, positioned along an optical path to receive light from said light emitting means, a means positioned along the first optical axis between said light emitting means and said input lens for producing two nominally parallel, coherent light beams from the coherent light beam produced by said light emitting means, means along the first optical axis for focusing virtual beam waists of the two coherent light beams one focal length of said input lens beyond said input lens, an afocal lens pair positioned along a second optical axis parallel to the first optical axis, and a retro reflecting means, movable along a third optical axis midway between and parallel to the first optical axis and the second optical axis, said retro reflecting means being configured to receive light traveling along the first optical axis, divert the light laterally, and return the light along the second optical axis antiparallel to its travel along the first optical axis, movement of said retro reflecting means along the third optical axis changing an optical path between said input lens and said afocal lens pair to cause a scanning effect such that, at a sensitive volume of said system along the scan, the two coherent light beams cross at a fixed crossing angle and maintain a constant crossing volume and focus spot diameter along the scan.

6. The Doppler system of claim 5 in which said negative input lens is positioned along said first optical axis, between said light emitting means and said retro reflecting means.

7. The Doppler system of claim 6 in which said retro reflecting means comprises a pair of planar mirrors which intersect orthogonally, said mirrors being positioned so that one of said mirrors intersects the first optical axis at a 45 degree angle and the other of said mirrors intersects the second optical axis at a 45 degree angle.

8. The Doppler system of claim 5 in which said input lens is positioned along the second optical axis between said retro reflecting means and said afocal lens pair, both said input lens and said retro reflecting means being simultaneously movable in the same direction along their respective second and third optical axes, said input lens being movable twice a distance said retro reflecting means is movable, so as to maintain input virtual beam waists focused by said virtual beam focusing means one focal length of said input lens beyond said lens input, between said input lens and said afocal lens pair.

9. The Doppler system of claim 8 in which said retro reflecting means comprises a pair of planar mirrors which intersect orthogonally, said mirrors being positioned so that one of said mirrors intersects the first optical axis at a 45 degree angle and the other of said mirrors intersects the second optical axis at a 45 degree angle.

* * * * *